United States Patent [19]

Capurka

[11] Patent Number: 4,553,426

[45] Date of Patent: Nov. 19, 1985

[54] REFERENCE PULSE VERIFICATION CIRCUIT ADAPTABLE FOR ENGINE CONTROL

[75] Inventor: Zbynek A. Capurka, Palatine, Ill.

[73] Assignee: Motorola, Inc., Schaumburg, Ill.

[21] Appl. No.: 613,653

[22] Filed: May 23, 1984

[51] Int. Cl.[4] .......................................... G01M 15/00
[52] U.S. Cl. ..................................... 73/116; 123/414
[58] Field of Search ............... 73/116, 117.3; 324/167, 324/168; 123/414, 643

[56] References Cited

U.S. PATENT DOCUMENTS

| Re. 29,810 | 10/1978 | Marino | 73/117.3 |
|---|---|---|---|
| 3,652,943 | 3/1972 | Piccirilli et al. | 328/120 |
| 3,795,867 | 3/1974 | Jones, Jr. | 328/133 |
| 3,843,871 | 10/1974 | Fujimaki et al. | 235/92 PD |
| 3,930,201 | 12/1975 | Ackermann et al. | 328/1 |
| 4,015,466 | 4/1977 | Stick et al. | 73/116 |
| 4,072,893 | 2/1978 | Huwyler | 324/208 |
| 4,091,425 | 5/1978 | Dakin | 360/38 |
| 4,142,159 | 2/1979 | Ingram et al. | 328/120 |
| 4,152,655 | 5/1979 | Przybyla et al. | 328/120 |
| 4,181,884 | 1/1980 | Shirasaki et al. | 324/208 |
| 4,262,251 | 4/1981 | Fujishiro et al. | 324/208 |
| 4,311,962 | 1/1982 | Titsworth | 328/120 |
| 4,345,209 | 8/1982 | Walker | 328/120 |
| 4,358,828 | 10/1982 | Reid et al. | 364/565 |
| 4,378,004 | 3/1983 | Petrie | 123/643 |
| 4,380,980 | 4/1983 | Javeri | 123/414 |
| 4,385,605 | 5/1983 | Petrie et al. | 123/414 |
| 4,387,684 | 6/1983 | Javeri | 123/416 |
| 4,457,286 | 7/1984 | Katayama et al. | 123/643 X |

Primary Examiner—Jerry W. Myracle
Attorney, Agent, or Firm—Phillip H. Melamed

[57] ABSTRACT

A reference pulse verification circuit is disclosed in which a sensor senses the passage of a number of teeth which project from a wheel rotated by an engine crankshaft. The projecting teeth are uniformly disposed about the wheel except for a missing tooth area corresponding to a predetermined angular reference position of the engine crankshaft. A missing pulse detector provides unverified reference pulses corresponding to the occurrence of the missing tooth reference position, and a verification counter is incremented in response to each sensor pulse produced in response to the passage of each rotating tooth. The counter output and the missing pulse detector output are combined such that a verified reference pulse is provided in response to each missing pulse detection which coincides with the occurrence of a predetermined tooth pulse count that was initiated after the occurrence of a preceeding missing pulse detection. In this manner spurious missing pulse detections can be differentiated from proper missing pulse detections which only occur after the passage of a predetermined number of teeth past the sensor. The count of the counter is reset in response to either the occurrence of a missing pulse detection and/or the attainment of a maximum count by the counter. The verified reference pulses are provided as an input to an engine control circuit which is enabled in response to the occurrence of the first verified reference pulse after the application of power to the control circuit.

15 Claims, 5 Drawing Figures

REFERENCE PULSE VERIFICATION CIRCUIT ADAPTABLE FOR ENGINE CONTROL

CROSS REFERENCE TO RELATED APPLICATIONS

The present invention is related to the invention described in copending U.S. patent application by Roy Hunninghaus and Edward Q. Almquist, entitled "Pulse Detector For Missing or Extra Pulses", Serial No. 613,654, filed May 23, 1984, and assigned to the same assignee as the present invention.

BACKGROUND OF THE INVENTION

The present invention relates generally to the field of reference pulse processing circuitry in which a reference pulse corresponding to the occurrence of a predetermined rotational position of a rotating shaft is received by a circuit and further processed. More particularly, the present invention is related to such a reference pulse circuit which is adaptable for control of an internal combustion engine.

In prior engine control systems it is known to sense the rotation of the engine crankshaft by sensing the passage of projections (teeth) present on a wheel rotated by the engine crankshaft. Typically, a large number of teeth are provided on the rotating wheel to provide crankshaft angular rotation resolution with the spacing between each tooth representative of a predetermined number of degrees of revolution of the engine crankshaft. These large number of teeth provide a means of monitoring the relative rotation of the engine crankshaft, but typically they do not provide information identifying one predetermined reference position of the crankshaft as opposed to other rotational positions. In some systems it is necessary to provide an indication of a reference position of the rotated wheel which is representative of a single reference rotational position of the engine crankshaft which occurs once for each crankshaft revolution. This reference position pulse is typically utilized to initiate proper sequential engine control and distinguish which one of the engine cyclinders should be receiving fuel and spark ignition at any particular time, whereas the large number of projecting teeth are utilized in determining the amount of fuel to be injected and the precise timing of the fuel injection and occurrence of spark in each engine cyclinder. Such systems are well known and include distributorless ignition systems and fuel injection systems such as those shown in U.S. Pat. Nos. 4,104,997, 4,338,813 and 4,338,903, all assigned to the assignee of the present invention.

Some prior engine control systems utilize one sensor to sense the passage of a large number of closely spaced teeth to provide precise resolution of engine rotation, while an additional separate sensor or the same sensor is utilized to sense either a specially shaped tooth or an extra one of the rotated teeth, a separate reference tooth rotated synchronously with the engine crankshaft. There are also a number of systems in which the engine crankshaft reference position is indicated by the occurrence of the absence of one of a large number of teeth on a rotating wheel wherein the remaining teeth provide pulses for the accurate angular resolution of engine crankshaft rotation.

In all of the prior systems, regardless of whether a specially shaped tooth, the absence of a tooth, or a separate sensor is utilized to sense a separate reference position projection, the occurrence of an erroneous reference position pulse is possible. The occurrence of a false reference pulse is actually quite likely in single sensor pulse detection systems during transient engine conditions such as abrupt engine acceleration and/or deceleration. While some engine control systems ignore pulse detections if they occur during certain conditions, such as dwell or spark, they do not insure the correctness of pulse detections at other times, and they do not insure that only true reference position pulses result in the implementation of engine control. If engine control is implemented in accordance with an erroneous reference position pulse, this can readily result in injecting fuel or initiating spark in an engine cyclinder at the wrong cycle time with the result being at least improper engine performance and possibly permanent engine damage.

SUMMARY OF THE INVENTION

An object of the present invention is to provide a reference pulse verification circuit which overcomes the above mentioned deficiencies of the prior systems.

A more particular object of the present invention is to provide a reference pulse verification circuit adaptable for use in an engine control system in which engine control is implemented in response to verified reference position pulses which are distinguished from unverified reference position pulses by noting the existence of a predetermined plurality of crankshaft rotational position pulses between the occurrence of each reference position pulse.

In one embodiment of the present invention there is provided: a reference pulse verification circuit comprising; means for producing reference pulses corresponding to the occurrence of predetermined reference rotational positions of a rotating shaft, means for producing a pulse train comprising a plurality of pulse train pulses which occur between the occurrence of said reference rotational positions of said shaft, and means for receiving both said reference pulses and said pulse train pulses and verifying the correctness of the occurrence of said reference pulses by providing a verified reference pulse in response to each reference pulse which occurs at substantially a predetermined number of pulse train pulses after the occurrence of a preceeding reference pulse, whereby spurious reference pulses can be differentiated from true reference pulses.

Basically, the preferred embodiment of the present invention utilizes a single sensor which senses projecting teeth on a rotating wheel rotated by an engine crankshaft. In response to the absence of one of the rotating teeth, the sensor, in combination with a missing pulse detector, provides a reference pulse signal. A verification counter effectively counts each one of the teeth sensed by the sensor and counts from zero up to a maximum predetermined count which represents the number of teeth which normally occur between sequential reference positions corresponding to the occurrence of the missing tooth position on the rotating wheel. The counter is reset in response to either the occurrence of this maximum count and/or the occurrence of any missing tooth detection signal. Whenever the maximum count of the verification counter corresponds to the occurrence of a missing tooth detection, then a verified reference position pulse is provided in response thereto, and the verified pulse is effectively provided to an engine control circuit which controls various functions such as spark/dwell and/or fuel injection. Preferably, the engine control circuit is enabled, after initial power is applied thereto, in response to the reception of the first verified reference position pulse.

By verifying the correctness of the occurrence of the reference position pulse, the present invention avoids having the engine control circuit respond to improper reference position pulses thereby minimizing the possibility of improper engine control due to the attempted implementation of spark or fuel injection operations in the wrong cylinder and/or at the wrong time. The present invention is most advantageously utilized when a single sensor is used to provide both the sequence initiating reference position pulses as well as the accurate high-resolution crankshaft position pulses, since in such cases the possibility of providing an erroneous reference position pulse is likely during engine transient conditions such as abrupt acceleration or deceleration. By resetting the verification counter after each reference pulse detection, regardless whether it is a correct or improper reference pulse detection, verified reference pulses will only occur when a known predetermined count is obtained between two sequential reference pulse detections. The resetting of the count of the counter in response to the occurrence of the predetermined maximum count representative of the number of teeth between two proper reference pulse detections, is an additional safety feature of the present invention and prevents the counter from continuing to count past the maximum predetermined count.

BRIEF DESCRIPTION OF THE DRAWINGS

For a more complete understanding of the invention reference should be made to the drawings, in which:

FIG. 2 comprises FIGS. 2a and 2b and is a series of graphs illustrating the operation of the engine control system shown in FIG. 1;

DESCRIPTION OF THE PREFERRED EMBODIMENT

Figure 1:
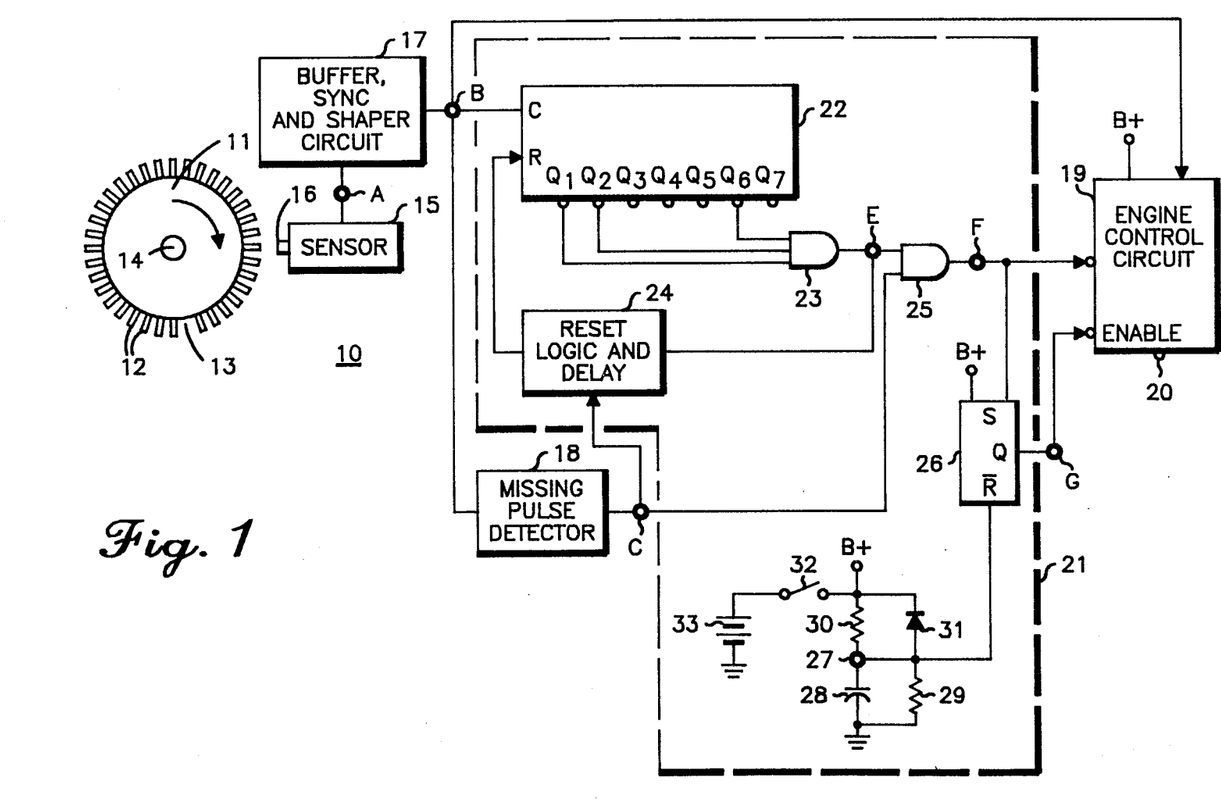
FIG. 1 is a schematic diagram of an engine control system utilizing the pulse verification circuitry of the present invention.

FIG. 1 illustrates an engine control system 10 which includes a wheel 11 having 35 outwardly projecting peripheral teeth 12 uniformaly spaced around the wheel 11 at 10 degree angular increments and including a missing tooth location 13. The wheel 11 is rotated about a central axis 14 corresponding to an engine crankshaft. The space between each of the teeth 12 represents a ten degree increment of angular rotation of the engine crankshaft with the missing tooth location 13 corresponding to a predetermined engine cylinder reference position of the engine crankshaft. While preferably the teeth 12 are uniformly spaced, this is not necessary for proper operation of the present invention.

A fixed sensor 15 is positioned adjacent to the wheel 11 and has an active sensor area 16 which senses the passage of the teeth 12 and provides, in response thereto, a corresponding pulse train signal at an output terminal A. The terminal A is provided as an input to a buffer, sync and pulse shaper circuit 17 which essentially processes the signal at the terminal A to provide an appropriately delayed and squared up pulse train signal at an output terminal B. The pulse train signal at the terminal B is provided as an input to both a missing pulse detector 18 and an engine control circuit wherein the engine control circuit implements such functions as controlling engine spark/dwell and engine fuel injection by providing control signals at an output terminal 20 which is representative of control terminals for engine cylinder spark plugs and/or fuel injectors. Such engine control circuits are well known and do not form an essential part of the present invention since they merely respond to crankshaft position pulses to provide the timing signals for implementing various engine controls which control the rotation of the engine crankshaft in accordance with predetermined relationships. The signal at terminal B is used by circuit 19 to determine the magnitude and timing of the engine control signals provided at terminal 20, while the circuit 19 responds to reference pulses (at terminal F) to effectively implement the proper sequence of control signals at terminal 20 to the proper engine cylinder apparatus.

The missing pulse detector 18 responds to the pulse train signal at the terminal B and provides a missing pulse detection output signal at an output terminal C in response to the passage of the missing tooth location 13 past the active sensing area 16. Thus the signal at the terminal C represents an unverified reference position pulse corresponding to a predetermined rotational position of the engine crankshaft corresponding to the missing tooth location 13 on the wheel 11. The missing pulse detector 18 can comprise any well known missing pulse detector configuration, such as, for example, the configurations discussed in U.S. Pat. Nos. 4,152,655, 4,311,962 or 4,345,209. Preferably the missing pulse detector corresponds in general to the apparatus disclosed in the above referred to copending U.S. patent application.

It should be noted that while a missing pulse detector 18 is utilized in the preferred embodiment of the present invention, the present invention is also usable with any type of reference position pulse detector apparatus which provides at the terminal C an indication of the occurrence of a predetermined rotational position of the engine crankshaft. Thus other reference detectors and apparatus which respond to either split or otherwise unusually shaped teeth are also contemplated by the present invention, as well as the utilization of an additional sensor, separate from the sensor 15, that responds to a separate projection on the rotating wheel 11 to provide a reference detection pulse at the terminal C.

The pulse train pulses at the terminal B and the reference position pulse signal at the terminal C are both provided as inputs to a reference pulse verification circuit 21 shown dashed in FIG. 1. The verification circuit 21 comprises a pulse train pulse counter 22 which has a clock input terminal c directly connected to the terminal B. The counter 22 serves as a verification counter that effectively directly counts the number of teeth on the rotating wheel 11 by counting the number of pulses produced by the sensor 15 in response to the passage of each of the teeth 12. Thus counter 22 can be considered a direct tooth counter since it is incremented one count for each tooth which passes the sensor 15.

Three count output terminals Q1, Q2 and Q6 of the counter 22 are connected as inputs to an AND gate 23 which provides an output at a terminal E. The terminal E is connected as an input to a reset logic and delay circuit 24 which also receives an input via a direct connection to the terminal C and provides an output signal that is connected to a reset terminal R of the counter 22. The terminal E is connected as an input to an AND gate 25 which receives an additional input via a direct connection to the terminal C and provides an output at a terminal F that is connected as a sequence initiating input to the engine control circuit 19. The terminal F is also connected to a set terminal S of a flip-flop circuit 26 which has its output terminal Q connected to a terminal G that is connected to an enable terminal of the engine control circuit 19.

A reset terminal $\overline{R}$ of the flip-flop 26 is connected to a terminal 27 that is connected to ground through the parallel combination of a capacitor 28 and a resistor 29 and is connected to a terminal B+ through a resistor 30 and a rapid discharge diode 31. The diode 31 discharges the capacitor 28 in case the power supply voltage drops. The terminal B+ is selectively connected via a switch 32 to a source of positive potential comprising a battery 33. The engine control circuit 19 and the flip-flop 26 receive operative power via connections to the terminal B+, and it is contemplated that other components of the invention may also receive operative power via such connections. The components 22–33 comprise the verification circuit 21.

Figure 2A:
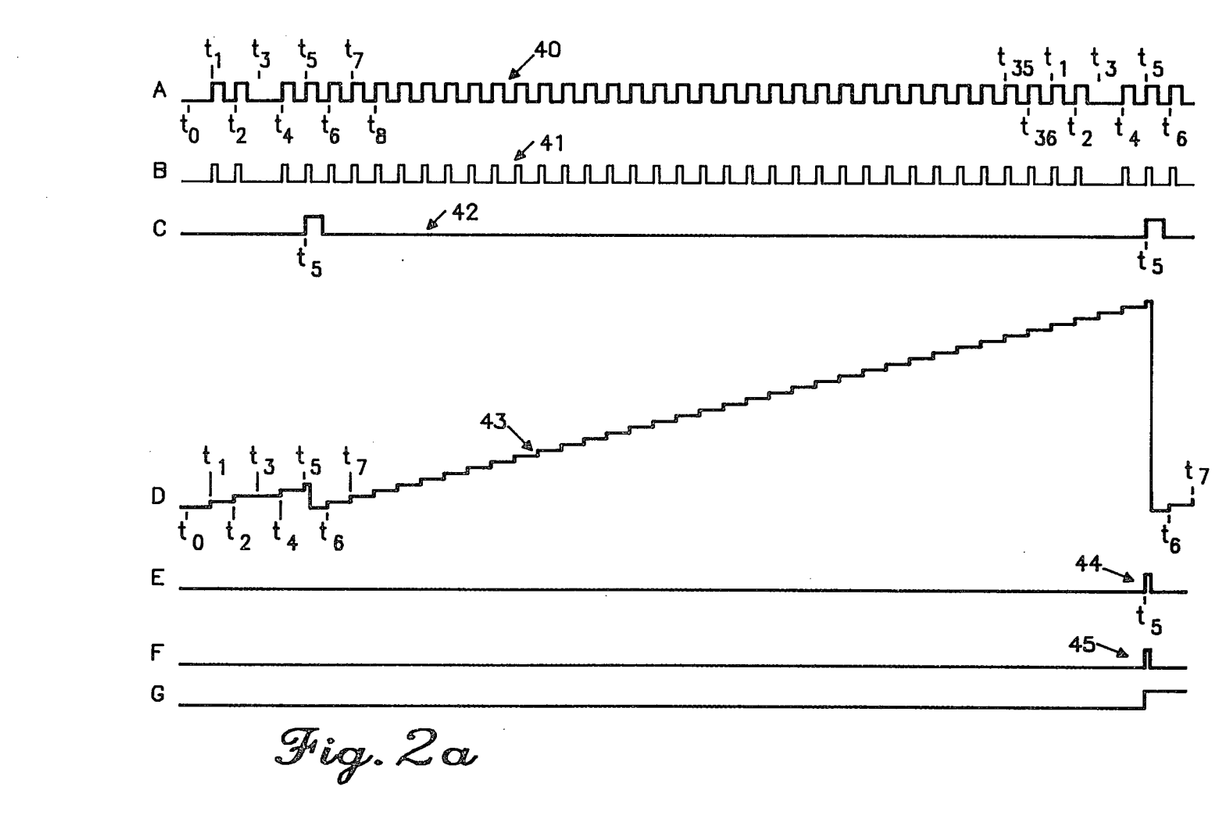
Figure 2B:
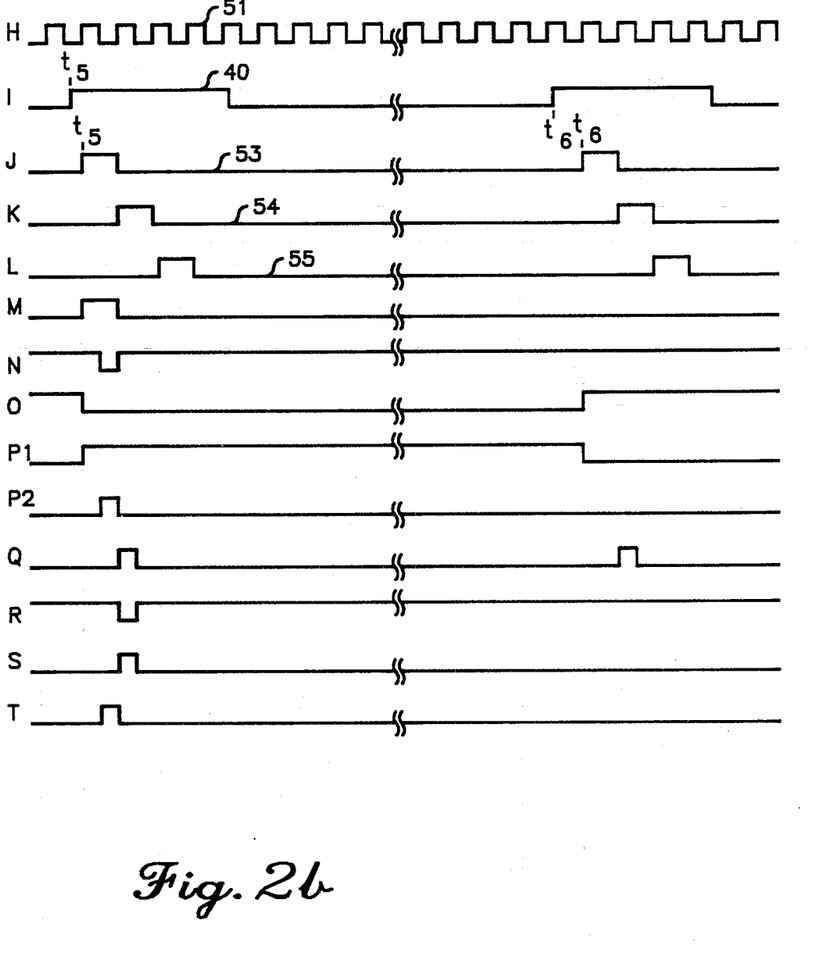

The operation of the engine control system 10 shown in FIG. 1 will now be discussed in conjunction with the signal waveforms illustrated in FIG. 2. In FIG. 2 signal waveform graphs A through G represent the electrical signals produced at the terminals A through G illustrated in FIG. 1. All the graphs A–G are drawn with the same horizontal axis time scale with the vertical axes representative of amplitude. The graph D in FIG. 2 represents the stepped count of the counter 22. The signal waveforms shown in the other graphs in FIG. 2 are representative of signal waveforms produced by the embodiment shown in FIGS. 3 and 4 of the present invention, and therefore these signals will be discussed later in conjunction with that embodiment.

Essentially, the wheel 11 is rotated by the engine crankshaft such that the 35 teeth 12 pass in proximity to the active sensing area 16 and produce in response thereto a series of tooth pulses which comprise a pulse train signal 40 at terminal A as shown in FIG. 2. At an initial time $t_o$ rotation of the engine crankshaft is commenced. At subsequent times $t_1$ and $t_2$ a tooth passes by the active sensing area 16 with the result being the creation of tooth pulses at the terminal A. It should be noted that while the signal at the terminal A indicates that a profile sensor is utilized for the sensor 15, obviously a reluctance sensor and appropriate signal processing circuitry could be utilized to provide substantially equivalent output signal pulses at the terminal A. At a subsequent time $t_3$ the missing tooth position 13 directly passes by the sensing area 16 and results in the nonoccurrence of a tooth pulse at the terminal A. Subsequently additional tooth pulses are provided in response to the passage of the teeth 12. The cycle of the signal 40 repeats after the passage of 35 teeth and the missing tooth location 13.

The buffer, sync and pulse shaper circuit 17 responds to the signal 40 at terminal A by providing in response thereto a signal 41 comprising short duration pulses synchronized to a high frequency reference oscillator. Such synchronization can be accomplished by many known techniques and is done to assist in implementing short duration known signal delays when they are needed. The times at which the pulses of the signal 41 occur substantially corresponds to the times $t_1$ through $t_{35}$ in graph A and are so shown in graph B. The circuit 17 may also be used to square up the signals at the terminal A and also to delay them, if appropriate, by small finite amounts when this is desired. This will be further discussed in conjunction with the embodiment shown in FIGS. 3 and 4. Thus in response to the signal 40 at the terminal A, an equivalent tooth pulse train signal 41 is provided at the terminal B.

The signal 41 is provided as a timing input to the engine control circuit 19 and also as an input to the missing pulse detector 18. The missing pulse detector 18 comprises circuitry which is able to distinguish between the repetitive occurrence of the pulses corresponding to the teeth 12 and the absence of one of these pulses corresponding to the occurrence of the missing tooth location 13. In response to the missing pulse location 13 the detector 18 provides a missing tooth detection signal 42. This is illustrated in FIG. 2 graph C as comprising a reference detection pulse commencing substantially at the time $t_5$ and terminating prior to the time $t_6$. It should be noted that preferably the present invention contemplates detecting the occurrence of the missing pulse at the time $t_3$ by providing a detection signal pulse substantially at the time $t_5$. However, even if missing pulse detectors are utilized which provide for an earlier detection of the missing pulse, the present invention still can be utilized.

As was previously noted, the circuitry within the missing pulse detector 18 can be of any conventional design wherein many types of circuit configurations are known for such missing pulse detectors. The use of missing pulse detectors in engine control systems generally saves the expense of an additional sensor to provide a reference pulse. However, as was previously noted, such missing pulse detectors are subject to providing erroneous pulse detection outputs during abrupt engine transient conditions such as acceleration and/or deceleration. The present invention provides therefore for verifying the accuracy of the output of the missing pulse detector 18 and insuring that only verified missing pulse detections are allowed to determine the operation of the engine control circuit 19. The present invention can also be used to verify the correctness of any reference pulse detection apparatus wherein a known plurality of timing (tooth) pulses occur between reference pulses.

The counter 22 is incremented in response to each tooth pulse provided at the terminal B. This is indicated by the staircase step waveform 43 shown in FIG. 2 graph D. It is assumed that at the start time of $t_o$ the counter 22 is reset to a zero count by additional circuitry which is not shown in FIG. 1, wherein this can comprise a transient reset circuit responsive to the closure of the switch 32 that provides operative B+ power to the engine control circuit 19 and flip-flop 26. As indicated in graph D after two counts the waveform 43 maintains a fixed count of 2 until substantially the time $t_4$ when it is again upward incremented to 3 and then, after a very short duration upward increment to a count of 4, the counter 22 is reset in response to the occurrence of the missing pulse detection which occurs substantially at the time $t_5$ and results in resetting counter 22 slightly thereafter due to a delay implemented by circuit 24. This reset results in setting the counter 22 to a predetermined count of zero from which it is again upward incremented in response to the tooth pulse at $t_6$ and the other pulses comprising the pulse train signal 41 at the terminal B. The count of the counter 22 is upward incremented until it achieves a maximum predetermined count of 35 just after the next occurrence of $t_5$. Substantially at this subsequent time $t_5$ the missing pulse detector 18 will again produce a missing pulse detection pulse at the terminal C. When the counter 22 attains a count of 35, the AND gate 23 will provide a high output signal pulse 44 at the terminal E. When a missing pulse detection is provided by the detector 18, a similar high logic state will be provided at the terminal C as part of the signal 42. The coincidence of high logic states at the terminals E and C result in the AND gate 25 providing a high logic pulse 45 at the terminal F which is therefore representative of a verified missing pulse detection. This is because it is known that between two proper missing pulse detection pulses provided by the detector 18, a total of 35 pulse train tooth pulses must be provided as inputs to the counter 22. If there is no coincidence between the high logic signal of the pulse detection signal 42 and the maximum count signal 44 present at the terminal E, then no verified missing pulse detection will be provided at the terminal F. Thus the AND gate 25 effectively passes the unverified reference pulse 44 at terminal C to provide the verified reference pulse 45 at terminal F in response to the occurrence of the unverified pulse corresponding to the time occurrence of a final count of 35 of the counter 22.

The reset logic and delay circuit 24 responds to either the providing of a high missing pulse detection signal 42 at the terminal C or the attainment of a maximum count of the counter 22 indicated by the high logic signal 44 at the terminal E by, in response to either and/or both of these outputs, producing a reset of the counter 22 to a zero count. By resetting the counter 22 in response to each reference pulse detection provided by the missing pulse detector 18, this insures that if the detector 18 provides a missing pulse detection signal at other than the proper time, a maximum count of the counter 22 will not occur coincident with the next missing pulse detection provided by the detector 18, and therefore no verified reference pulse will be provided. This, therefore, insures that verified reference pulses are provided by the present invention only when a total of 35 tooth pulses are counted by the counter 22 between the occurrence of two sequential missing pulse detection signals provided by the detector 18. By resetting the counter 22 after the attainment of each maximum count, this prevents the counter 22 from continuing to upcount wherein this continued upcounting might result in the next missing pulse detection provided by the detector 18 as coinciding with a count of 35 of the counter 22 since all counters are cyclic in nature and therefore will continue to count in cyclic fashion unless they are reset.

It should be noted that the reset and logic delay circuit 24, besides effectively OR-ing the signals at the terminals E and C to provide a reset signal to the counter 22, also provides an appropriate delay function to these signals such that this resetting will occur after the attainment of a count of 35 causing a high pulse in signal 44 at the terminal E and/or after the occurrence of a proper missing pulse detection at the terminal C.

The components 26 through 33 in the FIG. 1 embodiment illustrate that the present invention provides for enabling the engine control circuit 19 in response to the first verified missing pulse detection which occurs after the application of power to the engine control circuit 19. This can best be explained as follows. In response to the closure of switch 32, operative power is provided at the terminal B+ to at least both the engine control circuit 19 and the flip-flop 26. At this time a low signal will still be provided at the terminal 27 due to the action of the capacitor 28. This low signal maintains the flip-flop 26 Q output reset at a low output state until the capacitor 28 charges up, at which time the flip-flop 26 can be set. A low state at the terminal G, which is directly connected to the flip-flop Q terminal, does not permit the enablement of the engine control circuit 19. This enablement function can be readily implemented by merely blocking the production of any control voltages at the output 20 by the engine control circuit until a high logic signal is provided at the enablement terminal of the circuit 19. As the capacitor 28 charges up, a high signal is provided at terminal 27 which will therefore allow the flip-flop 26 to be set. The signal at terminal 27 can be considered a power up transient signal.

In response to the first verified missing pulse detection signal provided at a terminal F, the flip-flop 26 is set to a high state as shown in FIG. 2, graph G which thereby enables the engine control circuit 19 to provide suitable control signals at the output terminal 20. This represents an additional safety feature of the present invention wherein prior to the production of the first verified missing pulse detection signal the engine control circuit will not be effectively enabled. This is typically desirable since until the engine control circuit has received a correct reference position signal, it will not know which engine cylinder is to be provided with fuel injection and/or which cylinder is to receive a spark voltage. Thus the present invention has provided for enabling the engine control circuit 19 in response to the occurrence of the first verified reference pulse detection after the power-up transient signal provided at the terminal 27 which resulted in maintaining the flip-flop 26 reset until some time after the initial application of power to the control circuit 19.

The operation of the embodiment of the present invention illustrated in FIGS. 3 and 4 will now be discussed with respect to how those embodiments implement all of the functions attributed to the embodiment depicted in FIG. 1. It should be noted that identical reference numbers and letters have been utilized in in FIGS. 3 and 4 to identify corresponding identical components and terminals shown in FIG. 1.

Figure 3:
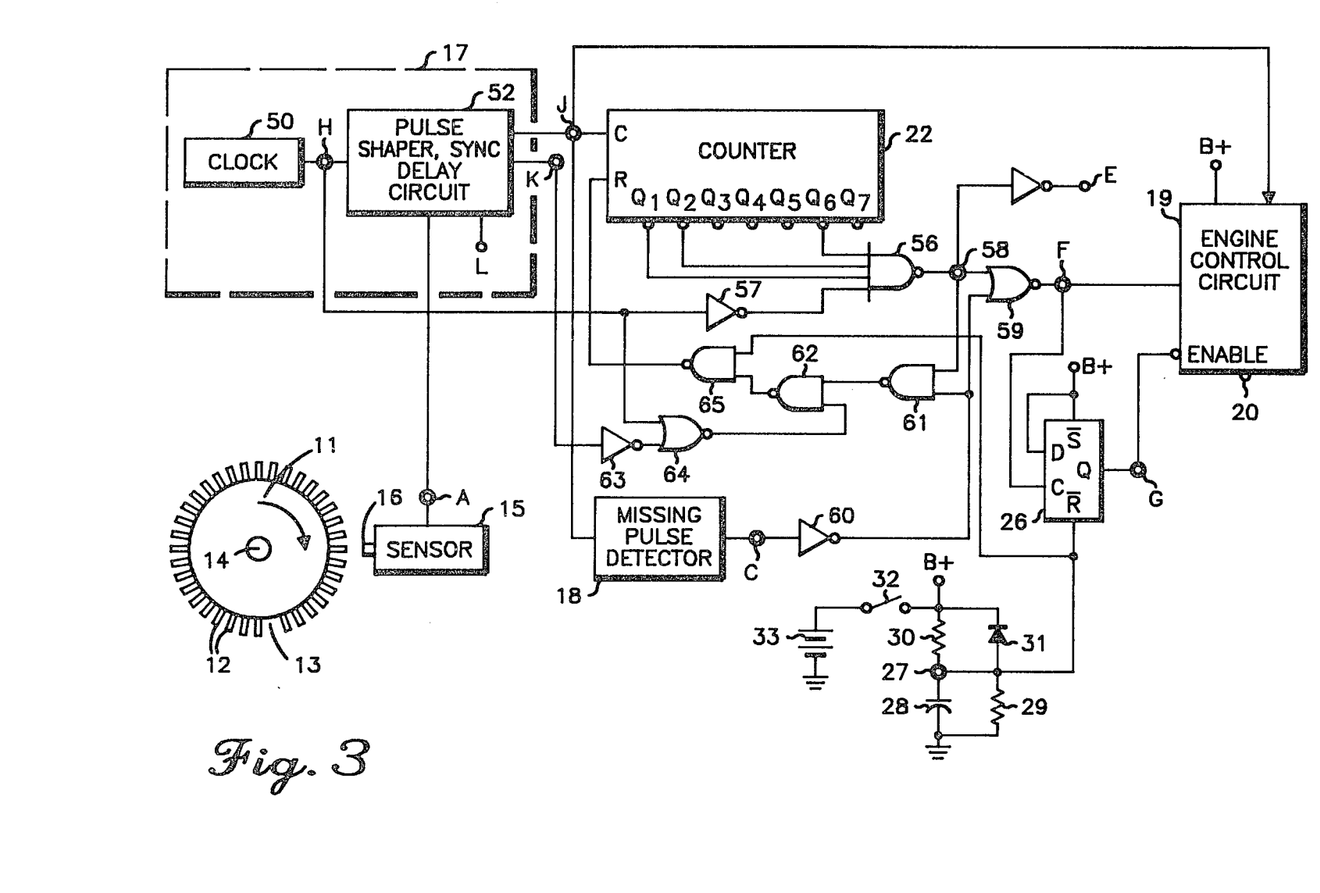
FIG. 3 is a detailed schematic diagram illustrating a specific embodiment for the engine control system shown in FIG. 1.

In FIG. 3, the buffer, sync and pulse shaper circuit 17 is shown as comprising a very high frequency clock 50 which provides a constant frequency one megahertz output signal 51 at a terminal H which is provided as an input to a pulse shaper and sync delay circuit 52 that also receives, as an input, the signal 40 at the terminal A. The circuit 52 essentially provides three synchronized but slightly delayed output pulse signals 53, 54 and 55 at terminals J, K, and L, respectively, in response to each tooth pulse provided as part of the signal 40. This is illustrated in the FIG. 2 waveforms H through L which depict the signals present at the terminals identified by the same letters wherein the signal 40 at the terminal A is represented by the waveform shown in FIG. 2 graph 1. It should be noted that the horizontal time axis scale for the signals shown in graphs H through T in FIG. 2 is identical, and this scale is greatly expanded with respect to the scale for graphs A–G as can be seen by noting the duration of the two pulses shown in graph I. It should be noted that the first tooth pulse shown in the graph I is the second $t_5$ pulse shown in graph A which is provided for after two proper missing pulse detections.

Figure 4:
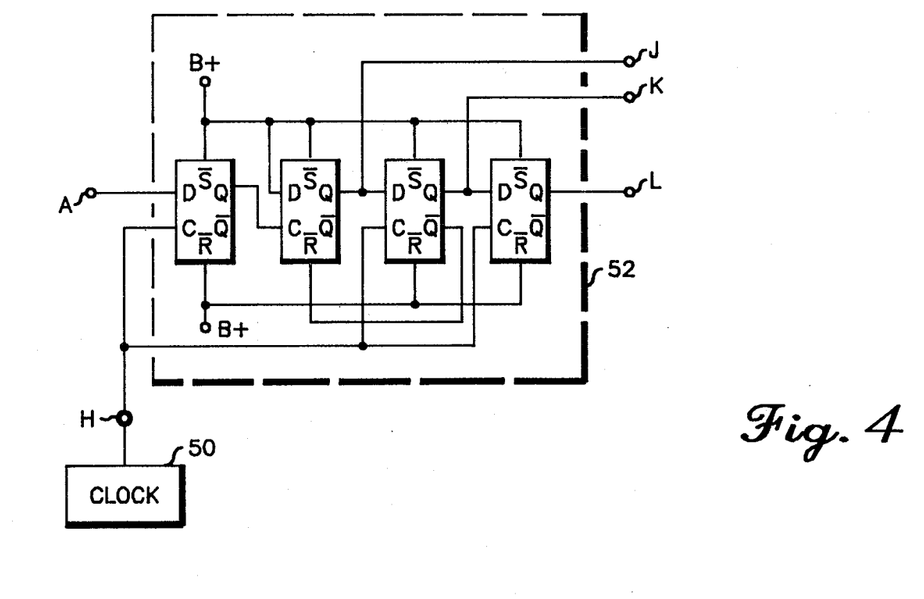
FIG. 4 is a detailed schematic diagram of one of the circuits illustrated in FIG. 3.

Essentialy the circuit 52, which is shown in substantially more detail in FIG. 4, synchronizes tooth pulses of the signal 40 to the high frequency clock signal 51 provided at the terminal H. Thus the synchronized signal 53 provided at the terminal J comprises a pulse which starts at the next clock pulse positive transition which occurs after the time $t_5$, and this pulse at the terminal J terminates at the next subsequent positive clock pulse transition. Similiarly, the signal 54 at the terminal K is identical to the signal at the terminal J, but delayed by one clock pulse period, and a similar statement applies to the signal 55 at the terminal L being delayed with respect to the signal 54 at the terminal K by one clock pulse period. In this manner three short duration slightly delayed pulses are provided for each tooth pulse created by the sensor 15 and the delay periods between these pulses can be utilized to insure the proper resetting of the verification counter 22.

The terminal J in FIG. 3 is connected as an input to the clock terminal of the counter 22 thus resulting in the clock 22 being incremented in synchronism with the high frequency clock signal 51 provided by the clock 50 and being incremented ahead of the occurrence of pulses on the corresponding but delayed and synchronized signals 54 and 55. The signal 53 is also provided as an input to the missing tooth detector 18 which preferably responds to this signal to provide a missing tooth reference pulse detection after the occurrence of the missing tooth position 13 and, preferably, after the occurrence of one additional tooth pulse and substantially coincident with the occurrence of the next additional tooth pulse at $t_5$.

It should be noted that the configuration shown in FIG. 4 for the pulse shaper and synchronizing delay circuit 52 is merely a typical configuration for a circuit which receives the signal 40 at the terminal A and provides synchronized but delayed output pulses in response thereto at the terminals J, K, and L as shown in the graphs J, K, and L in FIG. 2.

In FIG. 3, three output states Q1, Q2 and Q6 of the counter 22 are connected as inputs to a NAND gate 56 which also receives an inverted clock pulse signal input from the terminal H via an inverter stage 57. The logic provided by just the ANDing of the counter 22 states Q1, Q2 and Q6 is shown in graph M, and the output of the NAND gate 56 is provided at a terminal 58 and is shown in graph N and actually represents the inverted signal at the terminal E. The terminal 58 is connected as an input to a NOR gate 59 which receives an additional input shown in graph O from the terminal C via an inverter gate 60 and provides as its output the signal at the terminal F shown in graph T. The signal in graph O represents an inverted missing pulse detection signal, and is the inverse of the signal 42 shown in graph C. The output of the inverter 60 is also provided as input to a NAND gate 61 which also receives an input via a connection to the terminal 58 and provides an output shown in either graphs P1 or P2 as an input to a NAND gate 62. Graph P1 illustrates the output of gate 61 if a missing pulse has been detected, as it normally should be at the time $t_5$, and graph P2 shows the output of gate 61 if a missing pulse was not detected. It should be noted that in the first case the gate 61 output goes high because of a missing pulse detect whereas in the second case the gate 61 goes high because a counter maximum count was achieved. In any event, the end result will be the resetting of the counter due to gate 61 going high.

In FIG. 3 the terminal K is connected through an inverter 63 as an input to a NOR gate 64 which receives an additional input via a direct connection to the clock terminal H and provides an output shown in graph Q as an input to the NAND gate 62. The output of the NAND gate 62 is shown in graph R and is connected as an input to a NAND gate 65 which receives an additional input via a direct connection to the terminal 27 and provides a reset output shown in graph S directly to the reset terminal of the counter 22. The result of the connections of the elements 56 through 65 insures that the counter 22 will be reset after each 35 count attained by the counter 22 and/or after each missing pulse detection output provided by the detector 18 wherein this resetting will be synchronized with the high frequency clock pulses 51 of the clock 50 while also providing at the terminal F a verified missing tooth reference pulse (shown in graph T) if the detector 18 provides a reference pulse output which coincides with the maximum count of 35 of the counter 22.

In FIG. 3 it should be noted that the flip-flop 26 has now been illustrated as comprising a D-type flip-flop with the terminal F being connected to the clock terminal of the flip-flop and the not set ($\overline{S}$) and data (D) terminals being connected to the B+ terminal. It should be noted that the terminal 27, by virtue of its connection as an input to the NAND gate 65, results in the resetting of the counter 22 after the application of B+ power and maintains the counter 22 reset until some predetermined time after the initial power up transient.

In summary a reference pulse verification circuit has been provided in which the occurrence of an engine crankshaft reference position pulse has been verified by providing a verified reference pulse only in response to the coincidence of a reference position pulse with a predetermined incremented count of a counter wherein it is known that between proper reference position pulse occurrences a predetermined number of tooth pulses will be provided to a counter for counting thereby. While I have shown and described specific embodients of this invention, further modifications and improvements will occur to those skilled in the art. Such modifications, as previously noted, could comprise the utilizing of other types of reference position detectors rather than the missing pulse detector 18 contemplated by the present invention. Such other types of detectors could utilize a sensor in addition to the sensor 15 and could function by sensing a projection in addition to the projecting teeth 12. However, as was previously noted, the present invention preferably will utilize only a single sensor and this provides a substantial advantage when the output of this single sensor is utilized not only to provide accurate angular resolution pulses for the engine crankshaft, but also to provide engine rotational reference position pulses for the proper sequencing of an engine control circuit. All such modifications which retain the basic underlying principles disclosed and claimed herein are within the scope of this invention.

I claim:
1. A reference pulse verification circuit comprising;
   means for producing reference pulses corresponding to the occurrence of predetermined reference rotational positions of a rotating shaft,
   means for producing a pulse train comprising a plurality of pulse train pulses which occur between the occurrence of said reference rotational positions of said shaft, and
   means for receiving both said reference pulses and said pulse train pulses and verifying the correctness of the occurrence of said reference pulses by providing a verified reference pulse in response to each reference pulse which occurs at substantially a predetermined number of pulse train pulses after the occurrence of a preceding reference pulse, whereby spurious reference pulses can be differentiated from true reference pulses.

2. A reference pulse verification circuit according to claim 1 wherein said pulse train means includes a sensor positioned for providing an output signal comprising said pulse train pulses in response to the passage of a plurality of spaced projections positioned on a wheel rotated by said shaft, each pulse train pulse corresponding to predetermined rotational positions of said shaft.

3. A reference pulse verification circuit according to claim 2 wherein said reference pulse means comprises means for receiving the output signal of said sensor and providing said reference pulse signal in response to detecting the absence of at least one of said spaced projections.

4. A reference pulse verification circuit according to claim 3 wherein said verifying means includes counter means for counting the number of said pulse train pulses.

5. A reference pulse verification circuit according to claim 4 wherein said counter means includes preset means for effectively presetting the count of said counter to an initial predetermined count after and in response to the occurrence of each of said reference pulses.

6. A reference pulse verification circuit according to claim 5 wherein said verifying means includes means for effectively passing said reference pulse to provide one of said verified reference pulses in response to the occurrence of said reference pulse corresponding to the occurrence of a final predetermined count of said counter.

7. A reference pulse verification circuit according to claim 6 wherein said preset means includes means for also presetting the count of said counter in response to said counter achieving at least said final predetermined count.

8. A reference pulse verification circuit according to claim 1 which includes control means for receiving said verified reference pulses and implementing control of an engine in accordance with predetermined relationships in response thereto, said engine control affecting the rotation of said shaft.

9. A reference pulse verification circuit according to claim 8 wherein said control means also receives said pulse train pulses and provides said engine control in response thereto.

10. A reference pulse verification circuit according to claim 8 which includes enabling means for enabling said control means to implement said engine control in response to the occurrence of said verified reference pulses.

11. A reference pulse verification circuit according to claim 10 wherein said enabling means includes means for enabling said control means in response to the occurrence of the first of said verified reference pulses which occur after a power up transient signal indicative of the application of power to at least one of said control means and verifying means.

12. A reference pulse verification circuit according to claim 1 wherein said verifying means includes counter means for counting the number of said pulse train pulses.

13. A reference pulse verification circuit according to claim 12 wherein said counter means includes preset means for effectively presetting the count of said counter to an initial predetermined count after and in response to the occurrence of each of said reference pulses.

14. A reference pulse verification circuit according to claim 13 wherein said verifying means includes means for effectively passing said reference pulse to provide one of said verified reference pulses in response to the occurrence of said reference pulse corresponding to the occurrence of a final predetermined count of said counter.

15. A reference pulse verification circuit according to claim 14 wherein said preset means includes means for also presetting the count of said counter in response to said counter achieving at least said final predetermined count.

* * * * *